United States Patent [19]
Maki et al.

[11] Patent Number: 4,879,544
[45] Date of Patent: Nov. 7, 1989

[54] INTRUSION DETECTION SYSTEM

[75] Inventors: Melvin C. Maki; Walter J. Feller, both of Kanata, Canada

[73] Assignee: Control Data Canada Limited, Ottawa, Canada

[21] Appl. No.: 116,585

[22] Filed: Nov. 4, 1987

[30] Foreign Application Priority Data

Nov. 6, 1986 [CA] Canada .................................. 522371

[51] Int. Cl.⁴ .............................................. G08B 13/18
[52] U.S. Cl. ...................................... 340/552; 342/27
[58] Field of Search ............................. 340/552–554; 342/27–28; 333/237; 455/55

[56] References Cited

U.S. PATENT DOCUMENTS

| | | | |
|---|---|---|---|
| 3,794,992 | 2/1974 | Gehman | 342/28 |
| 3,829,767 | 8/1974 | Delogne | 455/152 |
| 3,947,834 | 3/1976 | Gershberg et al. | 340/554 |
| 4,091,367 | 5/1978 | Harman | 340/552 |
| 4,152,648 | 5/1979 | Delogne | 455/55 |
| 4,300,338 | 11/1981 | Harman et al. | 57/3 |
| 4,328,487 | 5/1982 | Cheal | 340/554 |
| 4,401,980 | 8/1983 | Rittenbach et al. | 340/666 |
| 4,536,752 | 8/1985 | Cheal et al. | 340/554 |

FOREIGN PATENT DOCUMENTS

1214232 11/1986 Canada .
1431243 4/1976 United Kingdom .

Primary Examiner—Glen R. Swann, III
Assistant Examiner—Thomas J. Mullen, Jr.
Attorney, Agent, or Firm—Jones, Tullar & Cooper

[57] ABSTRACT

An intrusion detection system using waves guided by the conductive outer sheath of a coaxial cable. An r.f. signal from a transmitter is supplied between the inner conductor and outer conductor or shield in conventional fashion. Coupled wave devices are spaced along the cable; each coupled wave device transferring r.f. energy between a transmission mode within the cable and a guided mode propagated along the exterior of the conductive outer shield. In one embodiment a second coaxial cable similarly provided with coupled wave devices is spaced from the transmitter cable and has one end connected to a receiver. The change in r.f. coupling between the cables caused by an intruder produces variations in the r.f. energy coupled to the second cable which is detected at the receiver. Alternative embodiments include the use of a single cable with coupled wave devices adapted for both transmission and reception. Further alternative configurations include the use of a leaky coaxial cable, preferably buried, operating in combination with a cable provided with coupled wave devices. In some circumstances a single elongated conductor can support the guided mode. The guided mode can be established in the outer shield or single conductor by an external source and need not always be coupled from the cable interior.

22 Claims, 6 Drawing Sheets

INTRUSION DETECTION SYSTEM

BACKGROUND OF THE INVENTION

1. Field of the Invention

The invention of this application relates to an intrusion detection system and, in particular, to an intrusion detection system employing r.f. waves surrounding and guided along the outer sheath of a coaxial cable. Any intruder in the vicinity of the cable produces changes in the electromagnetic field which are detected and used as an indication of intrusion.

2. Background Information

Various intrusion detection systems are known using cables extending along the perimeter of an area to be protected. U.S. Pat. No. 4,091,367 (Canadian Patent No. 1,014,245) teaches the use of a pair of leaky coaxial cables buried in the ground and extending around such a perimeter. A transmitter supplies r.f. energy to one of the leaky cables and a receiver is connected to the other. The field set up by the transmitting cable links with the receiving cable. The resulting signal at the receiver has a fixed component, known as "profile" plus a variable component formed by any change in the received energy resulting from the presence of an intruder or a target. A signal processor at the receiver separates the profile and target signals, compares the target signal with a threshold and activates an alarm. If pulse transmission is used, the target location along the length of the cable pair can be determined by the timing of the pulse return as in conventional radar.

Systems of this type frequently use specially designed leaky cables of the type described in U.S. Pat. No. 4,300,338 (Canadian Patent No. 1,079,504). To produce a uniform sensitivity to targets appearing along their length the cables are usually graded, which means the aperture size in the outer conductor of the cable varies along its length so that the cable coupling increases proportional to the signal attenuation in the cables. Such grading is used when the transmit and receive ends of the cables are adjacent, (termed contradirectional) so that the total signal path to and from the target increases as the target moves along the cable away from the transmitter and receiver. With the transmitter and receiver at opposite ends of their respective cables (termed co-directional) grading is not required for uniform sensitivity, since the total signal path is a constant distance for any target location. Grading may be used for other reasons, for example, to compensate for perimeter variations in cable-antenna systems or to maintain emission levels below a regulatory limit.

Typical operating frequencies for such systems are in the range 30-100 MHz. This range is chosen because it is of the order of the resonant frequency of a human intruder and hence provides inherent discrimination against smaller animals. Also the frequency is both low enough to provide low coaxial cable attenuation losses, and high enough so that the leaky cables couple efficiently to and from their exterior. Other frequencies may be used if different objects are to be detected.

Typically the cables are buried beneath the surface of the ground in order to maintain the system covert. This has the added advantage that interaction of differing modes of electromagnetic propagation are largely avoided, since the ground is lossy. It is known that for leaky cables in air, these interacting modes can produce "mode cancellation", or standing waves which cause the sensitivity to targets to be non-uniform with distances along the cable length. Cheal U.S. Pat. Nos. 4,328,487 and 4,536,752 disclose a different form of intrusion detection system in which a coaxial cable is provided with spaced antennae, which direct radiation outwardly. This system is mounted on a fence and director elements are used to direct the radiation pattern away from the fence. Any intruder reflects microwave energy back towards the antennae which are used also for reception, with a doppler detector positioned at the opposite end of the cable from the transmitter.

Gershberg U.S. Pat. No. 3,947,834 issued on Mar. 30, 1976 discloses a leaky cable system using a special cable alleged to produce a radiated energy flow perpendicular, to the cable. The system utilizes the doppler effect exhibited by reflections from a target for detection.

As distinct from use of such outwardly directed waves, the present invention employs waves propagating along the outer conductor of a coaxial cable. Such waves are similar to those produced from the apertures of a leaky coaxial cable but without the disadvantage of interaction between them mentioned above. The use of such waves for communication purposes is disclosed in Delogne U.S. Pat. No. 3,829,767 issued Aug. 13, 1974. One of the early uses of leaky cables was for mine and tunnel communications, where the field around the cable allowed spatially continuous communications typically between hand-held transceivers or transceivers and a base station. As an alternative to leaky coaxial cables Delogne teaches the use of passive elements called mode converters. These are devices which can be inserted in a normal non-leaky coaxial line and which couple some of the energy between the cable interior and exterior. They have the advantage of being more efficient than leaky cables, but suffer the disadvantage that they become less economic due to the quantities required when spacing between converters is small. The spacing distance is dependent on the attenuation of modes of propagation exterior to the cable, which vary typically from about 1.dB/100' for cables in air to 1.dB/foot for buried cables. As an illustration, spacings in air of about 300 ft. are possible, while use with the cable buried in ground is likely cost prohibitive. Mine environments also tend to be variable in materials and construction, and hence attenuation is variable, making installation of mode converters difficult and resulting in some insensitive areas.

As taught by Delogne two types of waves may be generated outside the coaxial cable, one which propagates radially away from the source and the other which is guided along the outer surface of the cable. It is this second type of wave which is used in the present invention for obstacle or intrusion detection. Thus, the present invention uses a regular coaxial cable with spaced coupled wave devices, as opposed to a leaky coaxial cable. The function of each of these devices, hereinafter called CWD, is to transfer r.f. energy efficiently from a transmission mode within the cable to a guided mode along the exterior of the cable with minimal undesirable reflections or transmission losses.

It is also known to use surface waves or "Goubau" waves for detection or communication. For example Rittenbach (U.S. Pat. No. 4,401,980) teaches a system for intrusion detection using a twisted wire pair. Typical systems utilizing Goubau waves are constructed so that the majority of the field is both contained and guided within a thick dielectric coating of a conductor. The practical lower frequency limit for Goubau lines is 50 MHz. This type of system has problems with moisture and dirt contamination of the dielectric surface; which, for example, may later line attenuation. This usually necessitates a bulky protective cover for the dielectric.

SUMMARY OF THE INVENTION

Specifically, the present invention relates to an intrusion detection system comprising: a transceiver providing a source and receiver of r.f. energy and containing signal processing means for extracting information from any received r.f. signal; a coaxial cable coupled to the transceiver to conduct r.f. energy therein; and a series of coupled wave devices positioned at spaced intervals along the cable and adapted to locally transfer r.f. energy between a transmission mode within the cable and a guided mode along the exterior of the cable.

In its method aspect, the invention relates to a method of intrusion detection using a coaxial cable extending around a perimeter comprising the steps of: positioning coupled wave devices at spaced intervals along the cable; supplying r.f. energy to the cable whereby guided waves travelling along and exterior to the outer conductor of the cable are launched from the coupled wave devices extending along the cable, and the energy of the established field, altered by an intruder arriving at the coupled wave devices is conveyed by the coupled wave devices into the cable for transmission therein.

Generally, the system operates at frequencies similar to that of leaky coaxial cable systems, such frequency being selected in terms of object to be detected, sensor coupling and attenuation characteristics, sensor placement and spectrum licensing.

BRIEF DESCRIPTION OF THE DRAWINGS

Various embodiments of the invention will now be described in conjunction with the accompanying drawings, in which.

DESCRIPTION OF THE PREFERRED EMBODIMENTS

Figures 1, 2:
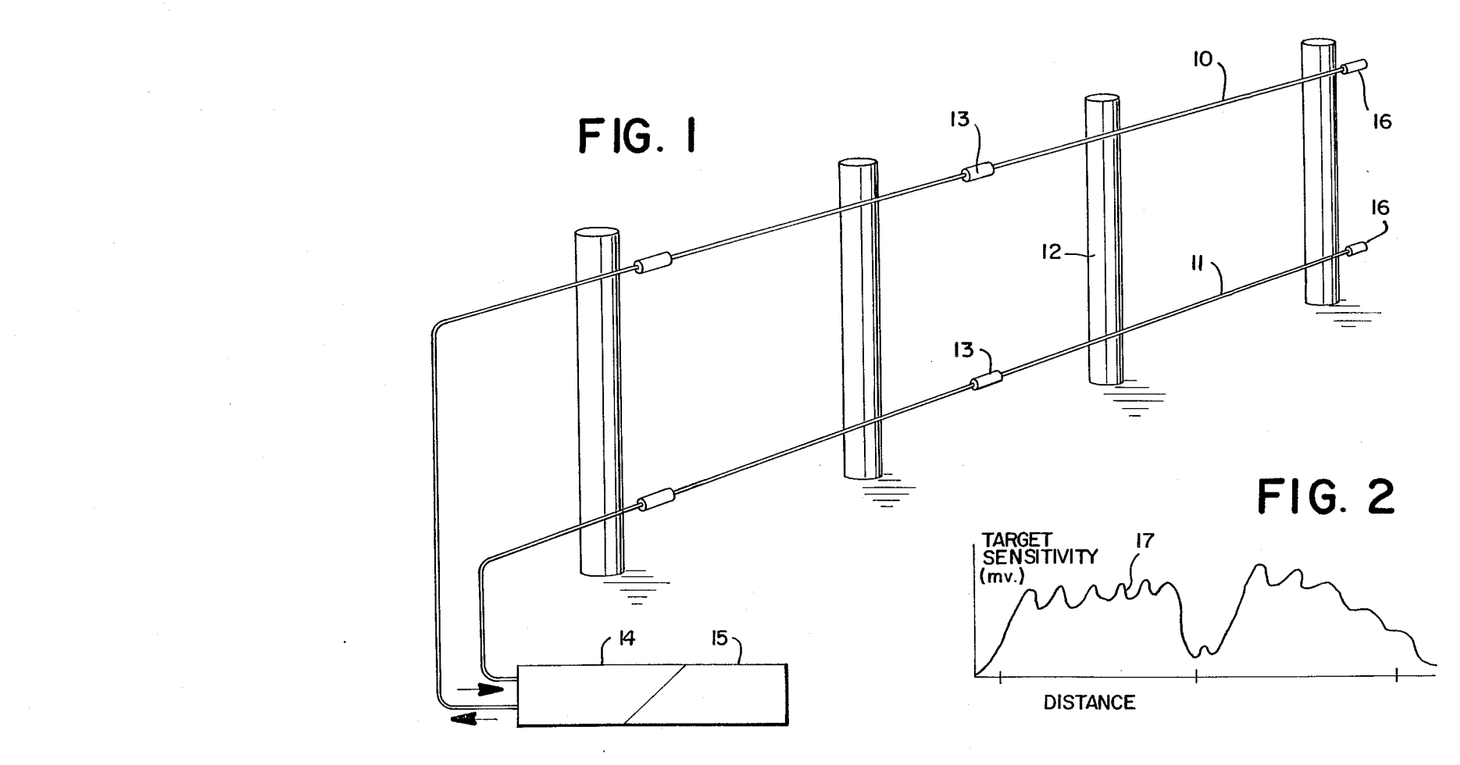
FIG. 1 is a schematic view of a detection system using two cables with spaced coupled wave devices.
FIG. 2 is a graph showing the response to an intruder of a system similar to that of FIG. 1.

FIG. 1 illustrates an intrusion detection system having transmitting and receiving cables 10, 11, respectively, both arranged above ground and supported on non-conductive posts 12. At spaced intervals along both the transmitting and receiving cable coupled wave devices (CWD's) 13 are provided which perform the function of converting a fraction of the energy between the normal TEM wave within the coaxial cable and an external or surface wave propagated along an exterior shield of the cable. The structure and functioning of the CWD's is discussed below in conjunction with FIG. 3. Each of the cables 10 and 11 is terminated at a matching impedance 16.

An r.f. transceiver 14 is connected to the cables and typically operates in the range 30–100 MHz. The system may operate with pulsed or c.w. signals. Synchronous detection may be employed to increase the signal to noise ratio. The CWD's located along the transmitting cable 10 serve to launch coupled waves which are guided by the outer coaxial surface of cable 10. If a target appears in the vicinity of the lines, energy reflected from the target is guided by the receiving cable 11, intercepted by a CWD in that cable and propagated internally back down cable 11 to the transceiver. It is then processed in processor 15 to locate and assess targets as has been described in the patents discussed above.

It will be noted that this system does not use leaky cables. The primary advantage of this system over known systems which use leaky cables is the clear and efficient separation of the propagation modes inside and outside the coaxial cables. The only interchange of energy between the mode occurs at the spaced CWD locations. Hence, there is no destructive along-line interaction and resultant loss of transmission efficiency, as in leaky coaxial cable systems when used in air. All modes exterior to the cables remain approximately in phase since, propagating in air, they have nearly the same velocity, that of light in free space. As a result, nearly parallel metal conductors, which create problems in aerial systems using leaky coaxial cables, are not a problem in this case.

A secondary advantage of the system is the efficiency of operation. Little loss occurs in the environment and the elements used are low resulting in a requirement for only low power levels or permitting long distances between transceivers or repeaters.

Since the waves launched from the transmitter travel in the opposite direction to the waves going to the receiver, this system is termed contradirectional. A disadvantage of a contradirectional system is that some form of grading is usually required, as the fields emitted by the CWD's decay along the line away from the devices at the attenuation rate of the external mode or modes of the cables. This results in a sawtooth variation in sensitivity with distance along the cable being observed between individual CWD's as the field decays and then a fresh signal is emitted. This may, in fact, be viewed as a form of "step" grading.

Another consequence of a CWD system is that a large reflecting or absorbing obstacle very near the cables can attenuate the stationary field over the remainder of a segment between CWD's, restricting the detection zone length. With leaky cable systems the sensitivity is effectively continually refreshed by the closely spaced apertures so minimal shadowing or dead-zone is observed near a fixed obstacle.

The graph 17 of FIG. 2 shows the results obtained for an intrusion detection system having two parallel 75Ω, 0.267" diameter coaxial cables. The cables were 200' along, separated 5' apart horizontally and each suspended 4' over a sand test bed. A CWD was connected to the mid-point of each line. Each CWD was an LC type converter designed to have a moderate Q (or sensitivity) at a frequency of 60 MHz. The coaxial lines were terminated in matching impedances and surface-wave attenuating ferrite beads deployed on lead-ins and at the cable terminations to avoid spurious coupling paths. FIG. 2 shows the magnitude of the received signal change, with the fixed profile removed, as an 170 lb. man walked midway between the cables from the start to the end. It will be noted that the sensitivity is relatively uniform with distance decaying gradually along the length away from the CWD due to external mode attenuation, with a ripple superimposed. For comparison it should be noted that a pair of ungraded leaky coaxial cables in the same configuration exhibit a large peak to null sensitivity variation, produced by the interaction of coaxial and exterior modes for the cables.

Figures 3A, 3B, 3C:
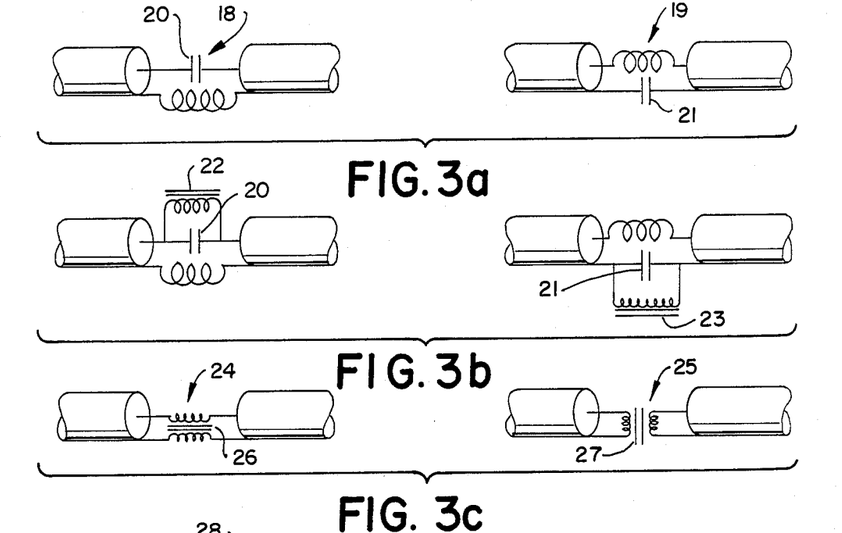
FIGS. 3a-3f shows various forms of coupled wave, devices useful in the system of this invention.
Figure 3D:
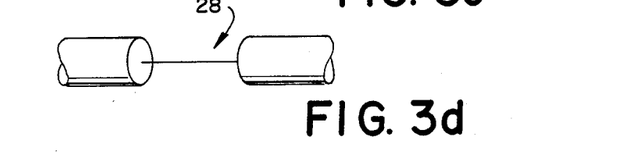
Figures 3E, 3F:
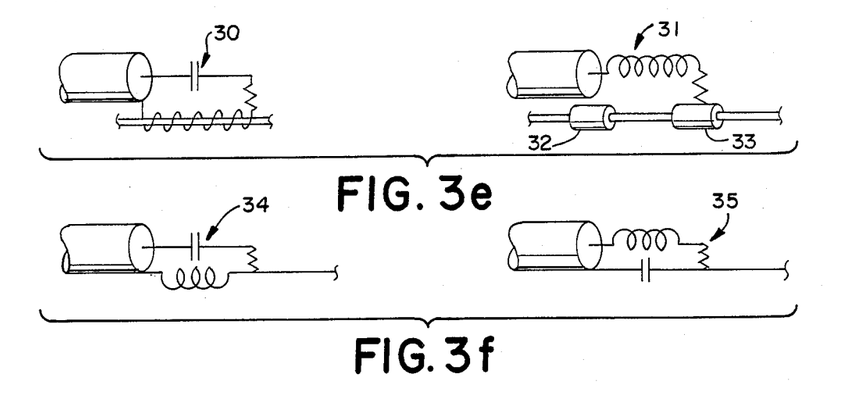

Typical forms of CWD's useful in this invention are shown in FIG. 3. The function of these CWD's is to launch or receive r.f. waves in air or similar low loss medium, the waves being guided by the outer shield of a coaxial cable or other elongate conductor.

FIG. 3(a) shows, at 18 and 19, two tuned LC configurations found to be particularly useful. Both designs have low insertion losses and have good impedance matching capabilities if tuned properly. By varying the Q-factor the coupling to the external mode may be altered. This means that the devices may be set to have varying sensitivities to compensate for cable losses so the overall system may have the same sensitivity. This CWD circuit is frequency selective which helps to reduce interference and improve the noise figure of the system. The bandwidth varies inversely with the Q-factor. The capacitors 20 and 21 may be provided with d.c. bypass chokes 22 and 23, respectively, as shown in FIG. 3(b) in order to use the line for communication at other frequencies or for supplying power over the line.

FIG. 3(c) shows broadband inductive CWD's 24 and 25 which can operate over a wide range of frequencies and pass all frequencies down to d.c.. This allows for broadband sensor operation but has the resulting disadvantage of increasing the amount of interference picked up. The design 24 with the longitudinally connected inductors 26 has parameters which vary by changing the turns ratio $N_1/N_2$. This design typically results in the device either having good coaxial transmission and poor external transmission or good external transmission with large coaxial losses. A large reflection coefficient on the external mode will result in interference patterns on the external mode creating areas with poor detection. This design will pass all frequencies down to d.c.

When designing with CWD's of the type shown at 25 in FIG. 3(c), having the transformer 27 across the coax conductors, the following considerations arise: firstly, the coax transmission loss is aproximately 6 dB and secondly, coax reflections are larger than the external coupling and transmission is low across the CWD. This design preferably utilizes ferrite wound transformers to achieve high coupling.

FIG. 3(d) shows a simple slot CWD 28. This type results in large reflections in the coaxial mode with a poor transmission coefficient. However, it does not require a physical connection to the centre conductor.

It will be clear from the preceding paragraphs that many variations are possible in the structure of a CWD. In some instances it may be desirable to launch a wave on the exterior of a cable from another cable. This can be achieved by inductive or capacitive coupling only to the outer shield of the cable to guide the wave without interfering with the interior coaxial mode. FIG. 3(e) shows configurations for coupling r.f. energy to the outer shield of a coaxial or multi conductor cable without interfering with any modes propagating interior to the cable shield. Both inductive and capacitive coupling configurations are shown at 30 and 31, respectively, the capacitive configuration 31 using a pair of concentric capacitors 32 and 33.

In a still further extension of this concept, r.f. energy can be coupled to a single conductor, as opposed to a coaxial cable, to travel therealong. FIG. 3(f) shows examples of CWD's for this purpose at 34 and 35.

Returning to the overall sensing system, in the embodiment of FIG. 1 the transmitter and receiver are located at adjacent ends of the cables. While this has the advantage of allowing the equipment to be compact, a different advantage can be obtained if the receiver is connected to the end of cable 11 opposite to the end adjacent to the transmitter connection of cable 10. This modified arrangement provides a constant path distance for all coupling received from a target and renders grading of the cable unnecessary. The term "grading" is used here to describe variations built into the CWD's so that the r.f. signal coupled to the exterior is varied with their position along the cable length. This can be used, for example, to maintain the sensitivity constant, or to control the external emissions.

Thus, for contradirectional sensing (the situation of FIG. 1) grading is achieved by increasing the sensitivity of the CWD's sequentially along the cable to take into account losses including both CWD and coaxial line loss. These two losses are quite small since non-leaky coaxial cable has a low value of attenuation and CWD's can be designed to have minimal reflective and transmission losses.

The coupled wave devices are inherently bi-directional and launch surface waves in both directions along a line and, by reciprocity, receive from both directions along a line. This has the advantage that a single CWD can cover a long distance along the cable on both sides of its physical position. In some situations, however, this feature may be a disadvantage either in producing unwanted sensitivity along the lead-in cables or in causing interference between segments. To achieve detection only in one direction along the cable directivity can be introduced by using a pair of CWD's positioned approximately $\lambda_o/4$ apart as taught in Delogne U.S. Pat. No. 3,829,767, where $\lambda_o$ is the wavelength in free space. This gives rise to cancellation of the reverse travelling wave launched by the first CWD by the reverse travelling wave from the second CWD. The separation is chosen so the total path (phase) length from the first CWD through the cable and back along the external mode is 180° (i.e. $\lambda_o/2$). Since the two velocities may differ the average of the two is used to determine the length.

An alternate method of obtaining partial directivity is the use of an open circuited stub connected at the reverse side of the CWD. This stub if chosen to be $\lambda_o/4$ in length creates a reflection coefficient of $-1$ at the CWD. The signal at the stub is reflected forward and adds with the forward travelling signal, the coupling coefficient for the forward mode being $-1$ times that for the reverse travelling mode.

In an alternative embodiment, both the transmitting and receiving cable of FIG. 1 can be modified by using such CWD pairs leading to an increase in directivity of between 20 and 30 dB. An increase in sensitivity is also achieved due to the addition of the backward and forward waves.

Figure 4A:
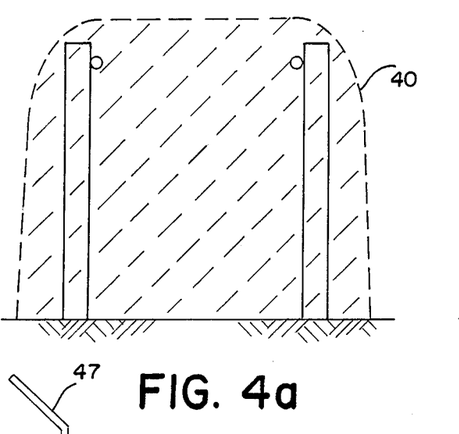
FIGS. 4a-4d shows a schematic diagram of various configurations of cable pairs including the use of one leaky coaxial cable in the pair.
Figure 4B:
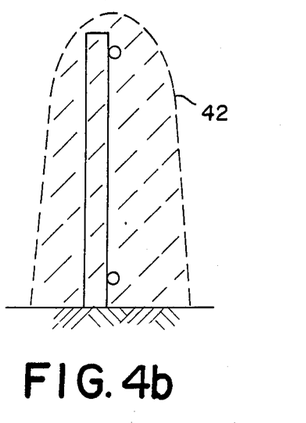

Various configurations of the transmitting and receiving cables are possible. It will be noted that the configuration of the system used to provide the test results shown in FIG. 2 differs from that of FIG. 1 in that the cables were arranged in a common horizontal plane rather than in a common vertical plane as shown in FIG. 1. FIGS. 4(a) and 4(b) illustrate the resulting detection zones 40 and 42, respectively, shown in dotted outline, for both these arrangements.

Figure 4C:
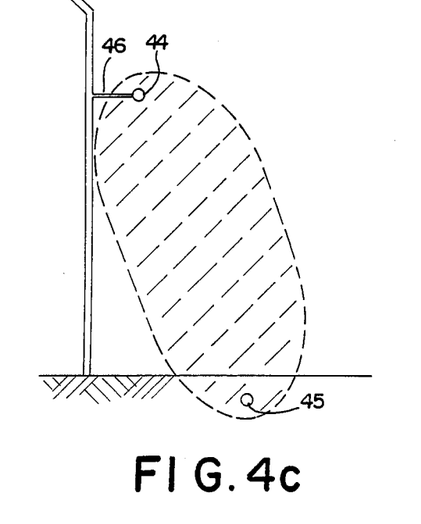
Figure 4D:
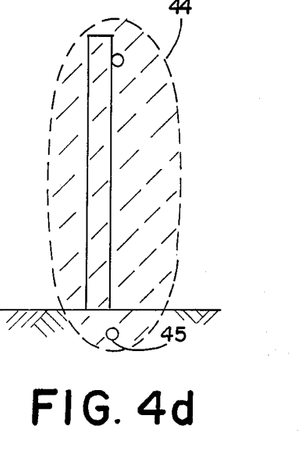

FIGS. 4(c) and 4(d) shown further alternative embodiments by use of a hybrid configuration having an above-ground cable 44 employing CWD's operating in conjunction with a buried leaky coaxial cable 45. This configuration has the advantage of providing a partially covert detection zone which may be quite large. FIG. 4(c) also illustrates a feature of the installation whereby the cables 44 can be mounted on a low conductivity stand-off 46 supported by a fence 48, which reduces the cost of mounting hardware.

Figure 5:
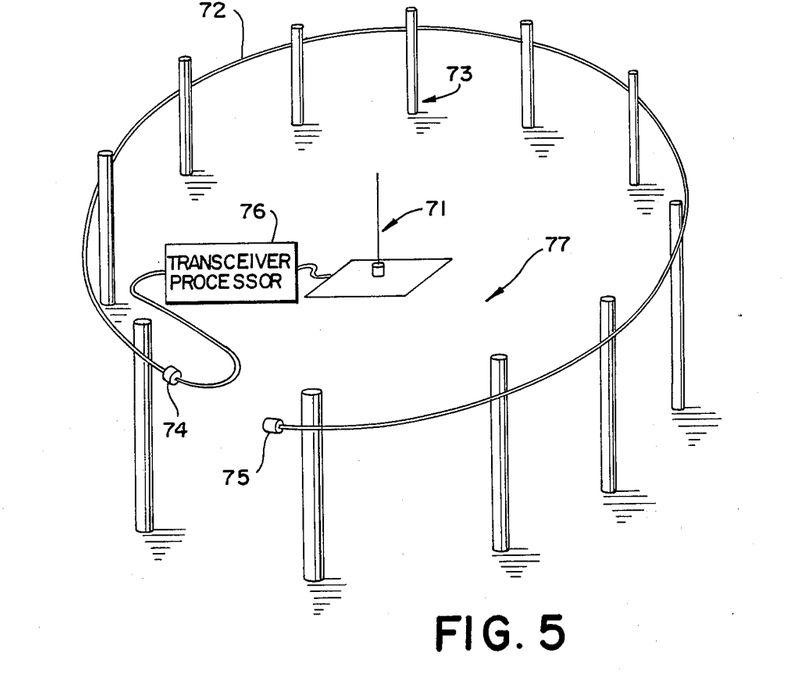
FIG. 5 shows an alternative embodiment using a single cable in conjunction with a centrally located antenna.

FIG. 5 shows the use of a centrally located antenna with at least one cable 72, around the perimeter, similar to the antenna - leaky cable combination shown in U.S. Pat. No. 4,419,659. The cable 72 is supported on posts 73 and has a surface wave established by CWD 74 guided by its outer conductor. The cable is terminated at 75 and a transceiver processor 76 is coupled both to the CWD 74 and the antenna 71. This configuration allows both perimeter detection along the cable as well as detection about the antenna.

Figure 6:
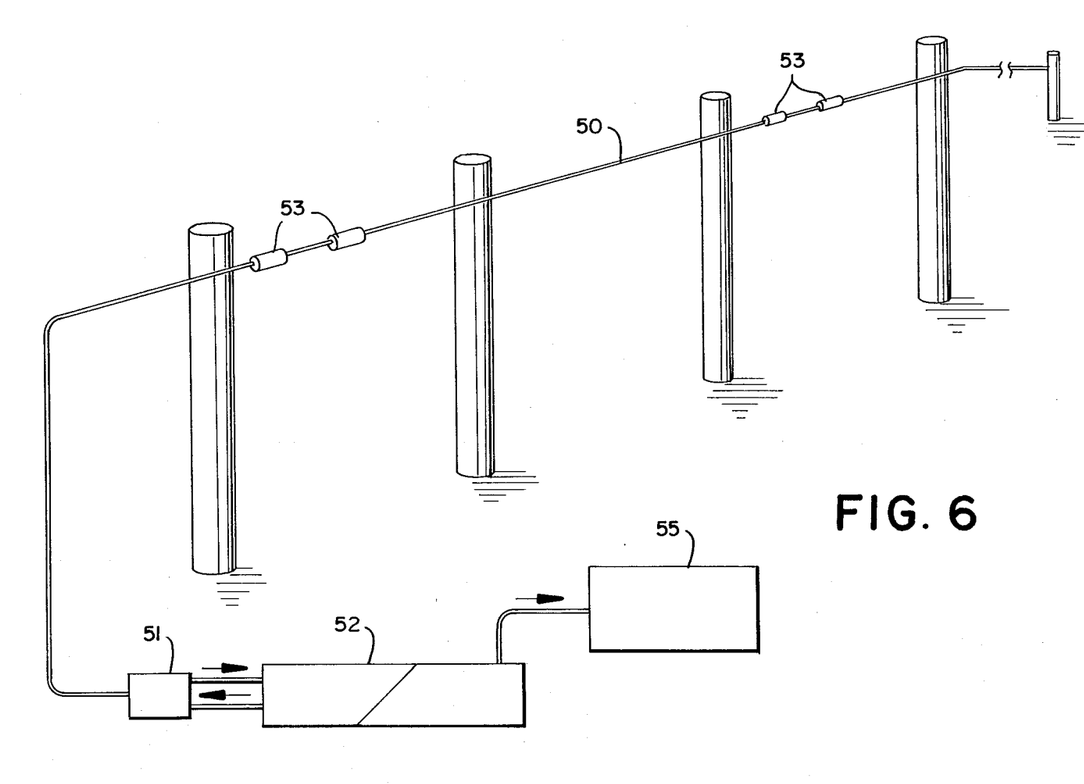
FIG. 6 shows a further embodiment using a single cable with spaced coupled wave devices.

An alternative embodiment of an intrusion detection system which uses a single cable is shown in FIG. 6. The cable 50 is connected to the transceiver/processor 52 by means of a directional coupler 51, splitter or the like. The directional coupler is a known device which separates the reverse travelling wave from the forward wave. By this method the reflected signal which is travelling towards the receiver/transmitter is separated from the transmitted signal which is travelling outwardly from the transceiver. A directive pair 53 of CWD's is arranged adjacent the transceiver end and further pairs arranged along the cable as required. As an alternative to the use of the directional pair it is possible to use a single CWD and an open circuited stub, as mentioned previously. The directive pair is not an essential feature of the system and a single CWD can be used.

A transmitted r.f. signal sent down the coaxial cable 50 from the transceiver 52 is coupled by the CWD's 53 onto the outer surface of the coaxial cable and onto any transmission lines formed by the coaxial cable outer conductor surface and nearby conductors, such as ground. Any intruder causes a local change in these transmission lines and causes a reflected signal. This reflected signal is then coupled back into the coaxial cable by the CWD's and travels back toward the transceiver. The directional coupler 51 in the coaxial cable separates the received signal which is then carried on a separate line to the receiver input port of the transceiver. The receiver signal is then processed to assess if an intrusion has occurred and, if so, alarm 55 is activated.

Due to the inherent high sensitivity of CWD's, target sensitivities of −55 dB relative to input have been achieved. This compares to −80 to −100 dB for pairs of leaky cables in the same environment.

Line 50, when properly matched and well constructed, has a profile caused primarily by the coaxial reflection at the CWD's which is a function of their Q. A directive pair of identical CWD's, however, produces two profile sources of approximately the same magnitude but differing phase. Hence the spacing and Q of CWD's can be optimized to reduce profile before the return signal reaches the transceiver. As an illustration, by employing this method the profile for the system has been reduced from −12 dB to −34 dB relative to input. The spacing of the CWD's to reduce their profile contribution is typically one quarter of the wavelength of the coaxial mode. This is used so the path length, in degrees, from one CWD to the next and back to the first is 180°. Usually the profile contribution (or reflection coefficient) of the CWD's in the pair are identical so the reflected signal from the first CWD is cancelled by the reflected signal of the second which is 180° out of phase by the time it reaches the first CWD. Some compensation for the transmission coefficients of the CWD's may also be required.

Test results for the system of FIG. 6 are quite comparable in detection characteristics to those of the system of FIG. 1. Sensitivity to intruders down to the ground level has also been achieved.

As previously discussed, because the modes exterior to the cable are all of similar velocity and the coaxial mode is well shielded, the intrusion system can tolerate the presence of close parallel conductors found in a typical environment. A 10 AWG copper conductor suspended along the coaxial cable surface to simulate the use of a conventional "cable" support or "messenger" wire showed little change in detection. In a leaky cable system, detection sensitivity would typically be destroyed from coupling to the conductor.

Additional parallel conductors spaced some distance away can serve to spread or alter the detection zone in some desired fashion as they constitute signal return paths and have reduced attenuation. Tests have shown a strong response to a walker target alongside a second unconnected cable spaced at a distance of 5'.

If the system of FIG. 6 is rearranged for co-directional detection, by connecting the receiver to the remote end of the cable from the transmitter, then the directional coupler is not required and indeed the coaxial cable itself is no longer required in the portion between transmitter and receiver CWD's. Instead a single conductor will perform the function of guiding the exterior wave. The signal reaching the receiving CWD is then coupled to the receiver by coaxial cable.

Figure 7:
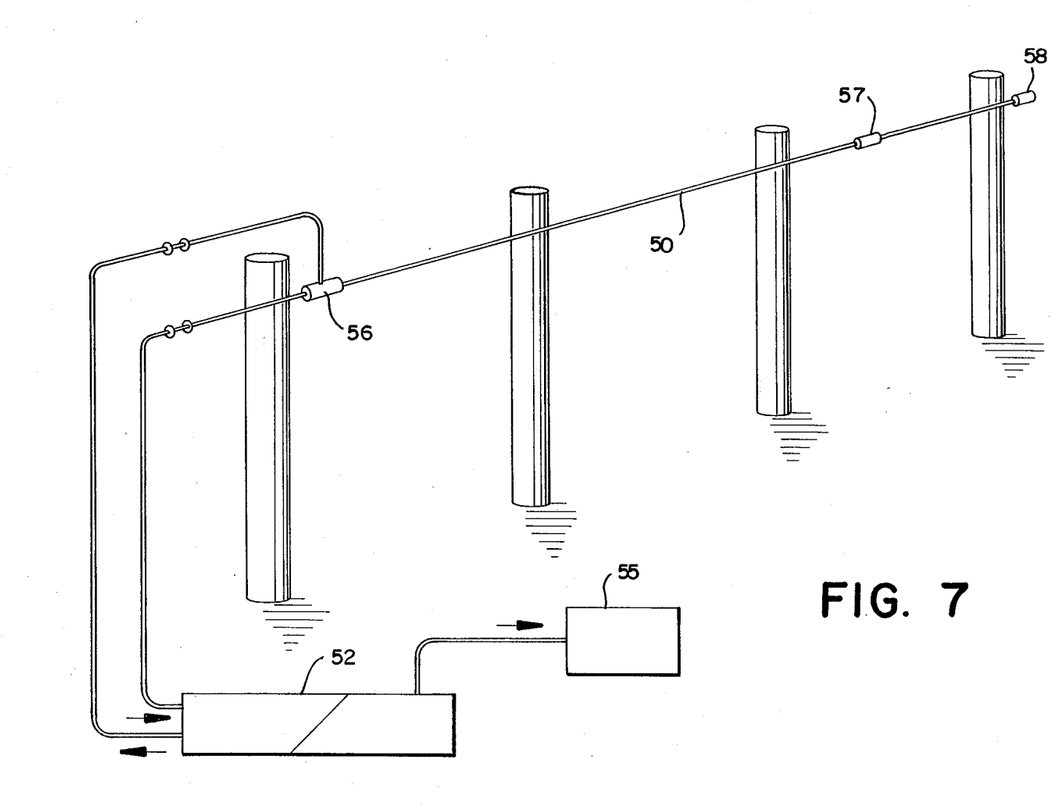
FIG. 7 shows an alternative embodiment also using a single cable.

A variation of the system of FIG. 6 is shown in FIG. 7. In this embodiment CWD 56 is coupled directly to the outer shield of the cable at the near end and another CWD 57 is coupled between the cable centre and outer conductor at the far end. The cable is terminated by a matching load at 58. This allows the transmitter and receiver to be located adjacent to one another while still providing the advantage of a co-directional sensor. In other words the transmitted signal is launched directly on to the exterior of the outer shield of the cable and the received signal at the remote CWD travels back in the coaxial mode in the cable.

With the coupling type CWD's having no mechanical connection it is possible to move the CWD's along the cable or vice versa. This is useful for portable sensors where the cable is coiled in its stored condition or in length variable sensors, or for use with existing cables or power lines. The configuration of FIG. 7 is adaptable for use as a portable sensor with the appropriate amount of cable 50 being pulled through CWD 56 from a cable storage drum adjacent or integral with the transceiver 52. As an alternative embodiment, an oscillator is provided at the remote end with an associated CWD to launch a surface wave towards the receiver end. The oscillator is provided with d.c. power through the central conductor of the coaxial cable conductors or by some other equivalent route. Cable 50 can be a coaxial cable or a multi conductor cable.

Figure 8:
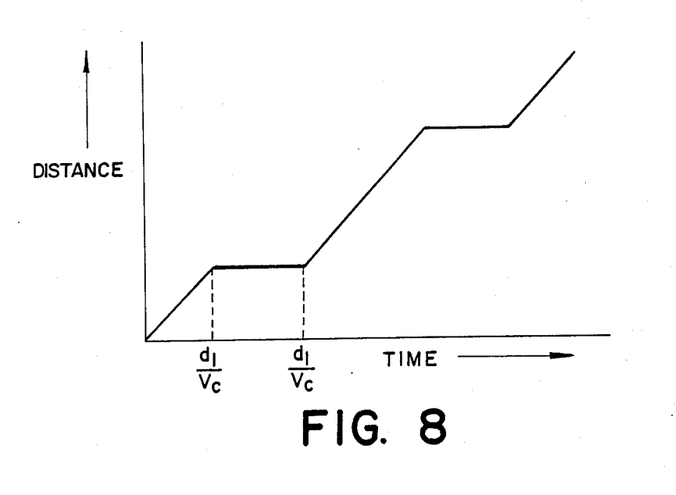
FIG. 8 shows a graph of the pulse return time versus distance for pulse operation of the systems of this invention.

Ranging can be performed as known in the prior art by using an RF pulse transmission and locating the target in distance from the round-trip timing of the received reflected pulse. In the case of a system having several CWD's along the cable, as shown in FIG. 1 for example, allowance must be made for the fact that the pulse typically travels at cable velocity $v_c$, approx. 0.78c within the cable, and at $V_e$, which approximates the speed of light c, exterior to it. Hence at the end of the first zone, for example, the target will be ranged in time either by the exterior mode first zone time $d_1/V_e$ or by the start of the second zone $d_1/V_c$. This gives a ranging versus time function for multiple zones as shown in FIG. 8, with periods of time with no return. This is not a problem of course since no distance gaps are produced. Normally the field in each zone is not allowed to spill over into other zones to cause multiple exterior paths.

Other variations will be clear to one skilled in the art. For example other two conductor or multi-conductor lines such as twin-lead or triax can be employed in place of the coaxial lines for the sensor, and used with appropriate CWD's. As well as intrusion, other applications of the device exist, for example object detection, counting, vehicles speed sensing, providing a secure data link or the like. Multiple cable use such as communication applications at other frequencies is also possible.

Thus, there has been described an improved detection system which is capable of manufacture at low cost. This is due to the cables being standard ungraded commercial CATV type drop cables or equivalent. No special leaky cables or grading is required, all "grading" being done if desired at the CWD's themselves. Incremental sensor costs are attributed to the CWD's and their connectors, dependent on the required spacing. These are low cost items, normally using only 2 or 3 passive components. A field installation procedure can be defined to allow precise tailoring of the sensor in the field to suit the local environment including determining the placement and sensitivity of individual CWD's.

We claim:
1. An intrusion detection system comprising:
a transceiver including a source of r.f. energy, a receiver and signal processing means for extracting information from any received r.f. signal;
at least one coaxial cable coupled to said transceiver to conduct r.f. energy from the source and transfer r.f. energy to the receiver; and
at least one coupled wave device positioned on the cable and adapted to locally transfer r.f. energy between a transmission mode within the cable and a guided mode along the exterior of the cable.

2. An intrusion detection system according to claim 1 wherein said coupled wave devices are arranged in pairs at each location, the devices of each pair being spaced by one quarter wavelength to provide said guided mode in only one direction along the cable.

3. An intrusion detection system according to claim 1 wherein an open circuited stub is located adjacent at least one of said coupled wave devices to reinforce the guided mode in one direction along the cable and to cancel the guided mode in the opposite direction along the cable.

4. An intrusion detection system according to claim 1, wherein a plurality of coupled wave devices are employed and the sensitivity of each of the coupled wave devices is selected to vary with its distance from said transceiver.

5. An intrusion detection system according to claim 1, further including at least one longitudinally extending conductor positioned spaced from and parallel to the coaxial cable whereby the detection zone of the system is altered.

6. An intrusion detection system according to claim 1, wherein the coupled wave devices are arranged in pairs and the spacing of the coupled wave devices is adjusted to minimize the magnitude of the signal return in the absence of a target.

7. An intrusion detection system comprising:
a transceiver including a source of r.f. energy, a receiver and signal processing means for extracting information from any received r.f. signal;
a single coaxial cable coupled to said transceiver to conduct r.f. energy from the source and transfer r.f. energy to the receiver; and
at least one coupled wave device positioned on the cable and adapted to locally transfer r.f. energy between a transmission mode within the cable and a guided mode along the exterior of the cable.

8. An intrusion detection system comprising:
a transceiver including a source of r.f. energy, a receiver and signal processing means for extracting information from any received r.f. signal;
a first coaxial cable coupled to said transceiver to be energized thereby;
a second coaxial cable coupled to said transceiver to transfer any received r.f. signal thereto; and
at least one coupled wave device positioned on each cable, each coupled wave device adapted to locally transfer r.f. energy between a transmission mode within the cable and a guided mode along the exterior of the cable.

9. An intrusion detection system according to claim 8 wherein said coupled wave devices are arranged in pairs at each location, the devices of each pair being spaced by one quarter wavelength to provide said guided mode in only one direction along the cable.

10. An intrusion detection system according to claim 8 wherein an open circuited stub is located adjacent at least one of said coupled wave devices to reinforce the guided mode in one direction along the cable and to cancel the guided mode in the opposite direction along the cable.

11. An intrusion detection system according to claim 8, wherein said first and second cables are arranged substantially in a vertical plane.

12. An intrusion detection system according to claim 8, wherein said first and second cables are arranged substantially in a horizontal plane.

13. An intrusion detection system according to claim 8, further including at least one longitudinally extending conductor positioned spaced from and parallel to the coaxial cable whereby the detection zone of the system is altered.

14. An intrusion detection system according to claim 8, wherein the coupled wave devices are arranged in pairs and the spacing of the coupled wave devices is adjusted to minimize the magnitude of the signal return in the absence of a target.

15. An intrusion detection system comprising:
a transmitter providing a source of r.f. energy connected to one end of a first coaxial cable;
a second coaxial cable located adjacent the first cable and spaced therefrom;
a receiver connected to an end of the second cable remote from the end adjacent to the transmitter; and
at least one coupled wave device positioned on each cable, each being adapted to locally transfer r.f. energy between a transmission mode within the cable and a guided mode along the exterior of the cable.

16. An intrusion detection system comprising:
a transceiver including a source of r.f. energy, a receiver and signal processing means for extracting information from any received r.f. signal;
a first coaxial cable coupled to said transceiver to be energized thereby;
a parallel leaky coaxial cable coupled to said transceiver to transfer any received r.f. signal thereto; and
at least one coupled wave device positioned on said first cable and adapted to locally transfer r.f. energy between a transmission mode within the cable and a guided mode along the exterior of the cable, whereby the first and second cables define an intruder detection zone.

17. An intrusion detection system comprising:
a transceiver including a source of r.f. energy, a receiver and signal processing means for extracting information from any received r.f. signal;
a coaxial cable coupled to said transceiver to be energized thereby;
at least one coupled wave device positioned on said cable and adapted to transfer r.f. energy between a transmission mode within the cable and a guided mode along the exterior of the cable; and
an antenna coupled to said transceiver, whereby the cable defines an intruder detection perimeter.

18. An intrusion detection system according to claim 17 wherein a plurality of coupled wave devices are employed and the sensitivity of each of the coupled wave devices is selected to vary with its distance from said transceiver.

19. An intrusion detection system comprising:
a conductor spaced from ground and extending between a pair of coupled wave devices;
a transmitter including a source of r.f. energy;
a first shielded line connecting said transmitter to one of said coupled wave devices;
a receiver including signal processing means; and
a second shielded line connecting the other of said coupled wave devices to said receiver;
whereby targets in the vicinity of said conductor alter the coupling between said coupled wave devices and the alteration is detected by said signal processing means.

20. A method of intrusion detection using a coaxial cable extending around a perimeter comprising the steps of:
positioning coupled wave devices at spaced intervals along said cable;
supplying r.f. energy to said cable whereby guided waves travelling along and exterior to the outer conductor of the cable are launched from the coupled wave devices, and energy arriving at a coupled wave device altered by a target is conveyed within the cable for transmission to a signal processing location.

21. A method of intrusion detection using a pair of coaxial cables extending around a perimeter comprising the steps of:
positioning coupled wave devices at spaced intervals along said cables;
supplying r.f. energy to one of said cables whereby guided waves travelling along and exterior to the outer conductor of that cable are launched from the coupled wave devices on that cable, and energy arriving at the coupled wave devices on the other cable altered by a target is conveyed within the cable for transmission to a signal processing location.

22. A method of intrusion detection using a conductor extending around a perimeter comprising the steps of:
positioning coupled wave devices at spaced intervals on said conductor;
supplying r.f. energy to one of said coupled wave devices whereby guided waves are launched to travel along the exterior of the conductor; and
connecting another of said coupled wave devices to a receiver whereby alterations in the energy received from said guided wave indicate the presence of an intruder.

* * * * *